(12) United States Patent
Reiniger et al.

(10) Patent No.: US 10,569,919 B2
(45) Date of Patent: Feb. 25, 2020

(54) SECURING DEVICE FOR A RETAINING-AND-CENTERING UNIT

(71) Applicant: KHS GmbH, Dortmund (DE)

(72) Inventors: Markus Reiniger, Mönchengladbach (DE); Holger Stenner, Haltern am See (DE)

(73) Assignee: KHS GmbH, Dortmund (DE)

( * ) Notice: Subject to any disclaimer, the term of this patent is extended or adjusted under 35 U.S.C. 154(b) by 145 days.

(21) Appl. No.: 15/749,316

(22) PCT Filed: May 25, 2016

(86) PCT No.: PCT/EP2016/061778
§ 371 (c)(1),
(2) Date: Jan. 31, 2018

(87) PCT Pub. No.: WO2017/021024
PCT Pub. Date: Feb. 9, 2017

(65) Prior Publication Data
US 2018/0222621 A1    Aug. 9, 2018

(30) Foreign Application Priority Data

Aug. 5, 2015    (DE) .......................... 10 2015 112 851

(51) Int. Cl.
*B65B 61/02*    (2006.01)
*B41J 3/407*    (2006.01)
(Continued)

(52) U.S. Cl.
CPC ........... *B65B 61/025* (2013.01); *B41J 3/4073* (2013.01); *B41J 11/002* (2013.01); *B65C 9/04* (2013.01); *B65G 17/46* (2013.01)

(58) Field of Classification Search
CPC ........ B65G 17/42; B65G 17/46; B65G 17/48; B41J 3/4073; B41J 11/002; B65B 31/04; B65B 61/025; B65C 9/04
(Continued)

(56) References Cited

U.S. PATENT DOCUMENTS 3,609,802 A    10/1971    Thorn et al.
5,259,913 A *  11/1993    Stover ................... B65C 9/045
                                                   156/447
(Continued)

FOREIGN PATENT DOCUMENTS

DE    10 2007 050 490    4/2009
DE    10 2009 041 527    2/2011
(Continued)

*Primary Examiner* — James R Bidwell
(74) *Attorney, Agent, or Firm* — Occhiuti & Rohlicek LLP (57) ABSTRACT

An apparatus to permit transferring the retaining-and-centering unit that has been supplied to the first handling-station in a receiving direction thereof to a second handling-station includes a carrier that carrier secures a securing device to the first handling-station, a receiving unit, a drive, and a securing apparatus that cooperate to detachably secure a retaining-and-centering unit to a first-handling station. The securing apparatus detachably secures the retaining-and-centering unit to the first handling-station. The receiving unit, which is on the carrier, connects the securing apparatus to the carrier. The drive moves the receiving unit parallel to the receiving direction.

20 Claims, 4 Drawing Sheets

(51) Int. Cl.
*B65C 9/04* (2006.01)
*B65G 17/46* (2006.01)
*B41J 11/00* (2006.01)

(58) Field of Classification Search
USPC ............ 198/867.14, 867.15, 346.2; 156/447, 156/566, 567, 571, 578; 53/510, 131.2
See application file for complete search history.

(56) References Cited

U.S. PATENT DOCUMENTS

| | | | | |
|---|---|---|---|---|
| 5,688,363 | A * | 11/1997 | Hinton | B65C 9/02 156/578 |
| 9,908,651 | B2 * | 3/2018 | Ehmer | B41J 3/4073 |
| 10,189,275 | B2 * | 1/2019 | Schach | B41J 3/4073 |
| 10,252,545 | B2 * | 4/2019 | Koers | B41J 3/4073 |
| 2018/0222621 | A1 * | 8/2018 | Reiniger | B41J 3/4073 |

FOREIGN PATENT DOCUMENTS

| | | |
|---|---|---|
| DE | 10 2010 036 028 | 3/2012 |
| DE | 10 2011 112 281 | 2/2013 |
| DE | 10 2011 112 300 | 3/2013 |
| EP | 2 100 815 | 9/2009 |
| EP | 2 792 603 | 10/2014 |

\* cited by examiner

ND-CENTERING UNIT

RELATED APPLICATIONS

This is the national stage under 35 USC 371 of international application PCT/EP2016/061778, filed on May 25, 2016, which claims the benefit of the Aug. 5, 2015 priority date of German application DE 10 2015 112 851.9, the contents of which are herein incorporated by reference.

FIELD OF INVENTION

The invention relates to container processing, and in particular, to transporting containers between handling stations of a container-handling machine

BACKGROUND

During container processing, a container encounters different machines that perform different tasks. Examples of machines include sterilizing machines, feature detectors, and printers. It is therefore necessary to somehow convey the container from one machine to the next.

For certain applications, it is important that the container retain a precise alignment. For example, when printing a multi-colored image on a container, the container must go through several printing machines, each of which prints a different color. The resulting printed image is a superposition of several printed images, each one in a different color.

The container must be brought from one printer to the next so that each color can be printed. Moving containers from one printer with next creates opportunity for error. When arriving at a new printer, the container must be correctly aligned. Otherwise the second colored image will not sit directly on top of the first.

Precise alignment is necessary for other tasks. For example, when detecting a feature on a container, it is important to have the feature in a place at which it can be seen. In a labeling machine, a misaligned bottle may find itself with a label at the wrong location.

SUMMARY

The invention provides a securing device for a retaining-and-centering unit of a container-handling machine that suppresses vibrations that occur as a result of transferring retaining-and-centering units.

In one aspect, the invention relates to a device for securing a retaining-and-centering unit at a handling station of a container-handling machine. The securing device includes a carrier that connects the device to the handling station. In particular, a rigid connection of the carrier with a supporting component of a transport element or a supporting component of a handling module provided on the transport element is provided.

The securing device also includes a securing apparatus. This securing apparatus can have an electromagnet. The securing apparatus preferably includes an arrangement of an electromagnet and a permanent magnet. In such cases, the electromagnet is configured and/or controllable in such a way that the magnetic field produced by the permanent magnet can be constructively and/or destructively overlaid with the magnetic field produced by the electromagnet.

The securing apparatus detachably secures, to the handling station, a retaining-and-centering unit that is supplied in a receiving direction of the handling station. The securing device also includes a receiving unit by which the securing apparatus connects to the carrier. This receiving unit is provided on the carrier such that a drive moves it in or parallel to the receiving direction.

An advantage of the securing device is that because the receiving unit is able to move relative to the carrier, and hence to the handling station, it is possible to reduce the distance between a receiving unit that releases a retaining-and-centering unit, hereafter a "releasing receiving-unit" and a receiving unit that receives it, hereafter the "receiving receiving-unit." This makes it possible to reduce vibrations caused by releasing and receiving the retaining-and-centering units.

According to one embodiment, the drive positions the receiving unit in an advanced position, in which the receiving or releasing of the retaining-and-centering unit takes place, and in a retracted position, in which the container handling takes place. Advancing the receiving unit shortens the distance between the releasing receiving-unit, which releases the retaining-and-centering unit, and the receiving receiving-unit, which receives the same retaining-and-centering unit. This tends to reduce the retaining-and-centering unit's to knock against the securing device.

The transfer is preferably effected in such a way that securing of the retaining-and-centering unit on the releasing receiving-unit is at least partly reduced or entirely eliminated and the retaining-and-centering unit is secured by the receiving receiving-unit through the activating or strengthening of securing forces. Reducing the distance between the releasing and the receiving receiving-units tends to reduce the speed at which the retaining-and-centering unit strikes the receiving receiving-unit. This reduces the amount of kinetic energy available to be transformed into vibration at the moment of collision. Positioning the receiving unit in the advanced position therefore tends to reduce vibration.

In an alternative configuration, the drive positions the receiving unit in a retracted position, in which the receiving or releasing of the retaining-and-centering unit takes place, and an advanced position, in which container handling takes place. In this case, it is possible to reduce the distance between the releasing receiving-unit and the receiving receiving-unit by retracting the receiving unit. This too tends to reduce vibration.

In some embodiments, the carrier includes a guide. The guide to guide the receiving unit parallel to the receiving direction. Examples of guides include sliding guides. Among these embodiments are those in which the guide ensures precisely linear displacement of the receiving unit. In such cases, the guides are linear guides. The presence of such guides promotes play-free or play-reduced displacement of the receiving unit. This, in turn, increases the positioning accuracy with which a container can be placed.

In some embodiments, a spring or other actuator couples the receiving unit to the carrier. Examples of actuators include electric actuators, pneumatic actuators, and hydraulic actuators. Providing a spring or actuator on the securing device ensures that the movement of the receiving unit in at least one direction is effected or at least partly supported by the spring or actuator.

Among the embodiments that have a spring are those in which the spring is a leaf spring and those in which it is a coil spring that configured as a compression or tension spring.

In some embodiments, the spring is tensioned when it moves into the advanced position in which either the receiving or the releasing of the retaining-and-centering unit takes place. In some of these embodiments, the spring is a U-shaped or substantially U-shaped leaf spring having a connecting region and two spring legs projecting out from the connecting region. In such embodiments, the connecting region attaches to the carrier and the spring legs couple to the receiving unit. As a result, the spring force deflects the spring's legs. The resulting stored energy can then be used for returning the receiving unit to its initial position.

In alternative embodiments, the spring is tensioned when the receiving unit moves to a handling position in which container handling takes place. This results in the receiving unit having a spring-loaded return movement.

According to one embodiment, the spring is configured such that the movement of the receiving unit to the retracted position is effected with the support of the spring force of the spring or solely by the spring force of the spring. In other words, the spring that is tensioned during the advancing of the receiving unit is used for the return movement during the retracting of the receiving unit. As a result, simple and cost-effective drive can be used for the moving of the receiving unit.

According to one embodiment, the drive is formed by a motorized, pneumatic or hydraulic drive. In other embodiments, the drive includes an electromagnet. An example of such a drive is an electromagnetic linear drive.

According to one embodiment, the drive moves the receiving unit to a fixed stop and secures it at that fixed stop. In doing so, the drive brings the receiving unit into contact with a contact region on the carrier. The receiving unit remains secured at the fixed stop after the transfer of the retaining-and-centering unit and during container handling. This ensures that, during container handling, the receiving unit remains in a defined position, thus achieving greater positional accuracy and promoting the ability to print with different colors of ink at different printing modules.

According to one embodiment, the receiving unit includes at least one protrusion or one recess that interacts with at least one corresponding recess or one corresponding protrusion of the retaining-and-centering unit. Such interaction promotes accurate positioning of the retaining-and-centering unit on the receiving unit in a direction at right angles to the receiving direction. In such embodiments, the protrusion's form matches that of the recess so that the protrusion fits snugly into the recess. This can prevent the retaining-and-centering unit from being vertically displaced as a result of multiple transfers between multiple handling-stations.

According to one embodiment, the receiving unit has hemispherical protrusions that at least partly engage a groove around a periphery of the retaining-and-centering unit. These arranged to form an isosceles triangle with two protrusions side-by-side at the upper portion of the receiving unit and the third protrusion along a centerline between the two in a lower portion of the receiving unit.

Some embodiments feature a receiving-unit in which a pair of contact-elements and a third contact element are vertically offset from each other along the receiving unit The contact elements that form the pair engage a U-shaped or V-shaped groove. The use of three contact-elements promotes accurate positioning of the retaining-and-centering unit at the receiving unit.

Some embodiments include a damper that damps any impacts that occur when transferring the retaining-and-centering unit. Among these embodiments are those in which the damper is on the receiving unit or between the movable receiving unit and the carrier.

Suitable embodiments of a damper are those formed by elastically deformable contact elements of by contact elements that can be displaced to absorb shocks, at least in the receiving direction. Other embodiments of dampers do so by being displaced to absorb shocks, at least in the receiving direction and which are arranged between the movable receiving unit and the carrier. The transmission of an impact to the other handling stations of the transport element can be further reduced as a result.

According to a further aspect, the invention relates to a container handling-apparatus including a container transport section on which the containers are moved for handling in a transport direction from a container inlet to a container outlet. The container transport section is formed by a plurality of transport elements that can be driven to rotate about a vertical machine-axis and on which the containers are held, centered and/or moved under control, with each container being secured by a retaining-and-centering unit on handling stations configured on the transport elements, and with the retaining-and-centering unit being arranged detachably on the handling station, by way of a securing device that includes a receiving unit and a carrier, in such a way that a transfer of a container from one transport element to a transport element following it in the transport direction is effected by the retaining-and-centering unit being passed on together with the container held on it. The receiving unit of the securing device is provided so that it can be moved on the carrier by the drive either in or parallel to a receiving direction in which the retaining-and-centering unit is fed to the securing device. A securing apparatus is also arranged on the movable receiving unit by way of which the retaining-and-centering unit can be detachably secured to the handling station.

The container handling apparatus offers the essential advantage that, because the receiving unit is able to move relative to the carrier and hence to the handling station, the distance between a receiving unit releasing a retaining-and-centering unit and a receiving unit receiving this retaining-and-centering unit can be shortened and the vibrations caused by the releasing and receiving of the retaining-and-centering units can be reduced significantly as a result.

According to one embodiment, in order to transfer the retaining-and-centering unit from a releasing securing device to a receiving securing device, the drive of the releasing securing device and/or of the receiving securing device are actuated in such a way that the movable receiving unit of the receiving securing device is moved toward the releasing securing device, that the movable receiving unit of the releasing securing device is moved to the receiving securing device or that the receiving units of both the releasing securing device and the receiving securing device are moved toward one another. As a result, the distance between the releasing receiving unit and the receiving receiving-unit, for example, can be reduced to such an extent that a play-free transfer is achieved, i.e. a transfer such that the retaining-and-centering unit is, at least at times, simultaneously in contact with the releasing and receiving receiving-unit. In addition, vibrations occurring during the transfer of the retaining-and-centering unit are not directly transferred to the machine module or the handling station due to the non-rigid connection of the receiving unit to the carrier.

According to another embodiment, in order to transfer the retaining-and-centering unit from a releasing securing device to a receiving securing device, the drive of the releasing securing device and/or of the receiving securing device are actuated in such a way that the movable receiving unit of the receiving securing device is moved to a radially-retracted position, that the movable receiving unit of the releasing securing device is moved to a radially retracted position or that the receiving units of both the releasing securing device and the receiving securing device are moved to a radially retracted position. As a result, the distance between the releasing receiving unit and the receiving receiving-unit for example can again be reduced to such an extent that a play-free transfer is achieved, i.e. a transfer such that the retaining-and-centering unit is, at least at times, simultaneously in contact with the releasing and receiving receiving-units. In addition, vibrations occurring during the transfer of the retaining-and-centering unit are not directly transferred to the machine module or the handling station due to the non-rigid connection of the receiving unit to the carrier.

According to one embodiment, for the transfer of the retaining-and-centering unit from a releasing securing-device to a receiving securing-device, the position of the movable receiving unit of the receiving securing-device is displaced such that as the handling stations move toward one another, as a result of the contrary rotary motion of two successive transport elements the retaining-and-centering unit is pressed up against the receiving unit of the receiving securing device and the latter is at least partially pushed back in the receiving direction. This achieves a play-free transfer between the releasing receiving unit and the receiving receiving-unit, during which both the releasing and the receiving receiving-units lie temporarily in contact up against the retaining-and-centering unit. Impacts that cause vibrations are further reduced during the transfer as a result.

According to one embodiment, the movement of the receiving unit takes place synchronously with the rotary motion of the transport element. In other words, those receiving units of the container handling apparatus which execute a transfer process, i.e. come to rest up against a handling station of a preceding/following machine module as a result of the rotation of the respective transport element, are respectively brought into an advanced or retracted position synchronously with the rotation of the transport element.

Despite the displacement of the receiving units therefore, the transfer of the retaining-and-centering units can take place as the onward motion or onward rotation of the transport elements continues.

According to another aspect, the invention relates to a method for transferring a retaining-and-centering unit between handling stations of a container-handling machine in which containers to be handled are moved along a transport section, with the container transport section being formed by a plurality of transport elements which can be driven to rotate about a vertical machine axis and on which the containers are held, centered and/or moved under control. Each container is detachably secured by way of a retaining-and-centering unit to handling stations configured on the transport elements. The retaining-and-centering unit is transferred from a handling station of a first transport element to a handling station of a second transport element in that the retaining-and-centering unit is detached from a releasing securing device of a handling station of the first transport element, said releasing securing device including a receiving unit and a carrier, and transferred to a receiving securing device of a handling station of the second transport element, said receiving securing device including a receiving unit and a carrier. To transfer the retaining-and-centering unit, the receiving unit of the receiving securing device is moved through a displacing motion that is radial relative to the vertical machine axis of the respective transport element and/or the receiving unit of the releasing securing device is moved radially relative to the vertical machine axis of the respective transport element.

The term "container" in the sense of the invention is used to refer to all packaging media, in particular bottles, cans etc.

The term "receiving direction" in the sense of the invention is used to refer to that spatial direction in which a retaining-and-centering unit is transferred from a releasing handling station to a receiving handling station. In the case of transport elements in the form of rotors driven to rotate about a vertical machine axis, this is in particular the direction which runs radially or substantially radially to that machine axis.

The term "retaining-and-centering unit" in the sense of the invention is used to refer to a unit which can be detachably connected to a handling station of a container-handling machine and used to hold and center a container relative to the handling station. In particular, the retaining-and-centering unit can be provided to hold the container suspended by the region of its container mouth.

As used herein, "substantially" or "around" mean variations from the respective exact value by ±10%, preferably by ±5%, and/or variations that are insignificant for function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

These and other features of the invention will be apparent from the following detailed description and the accompanying figures, in which.

DETAILED DESCRIPTION

Figure 1:
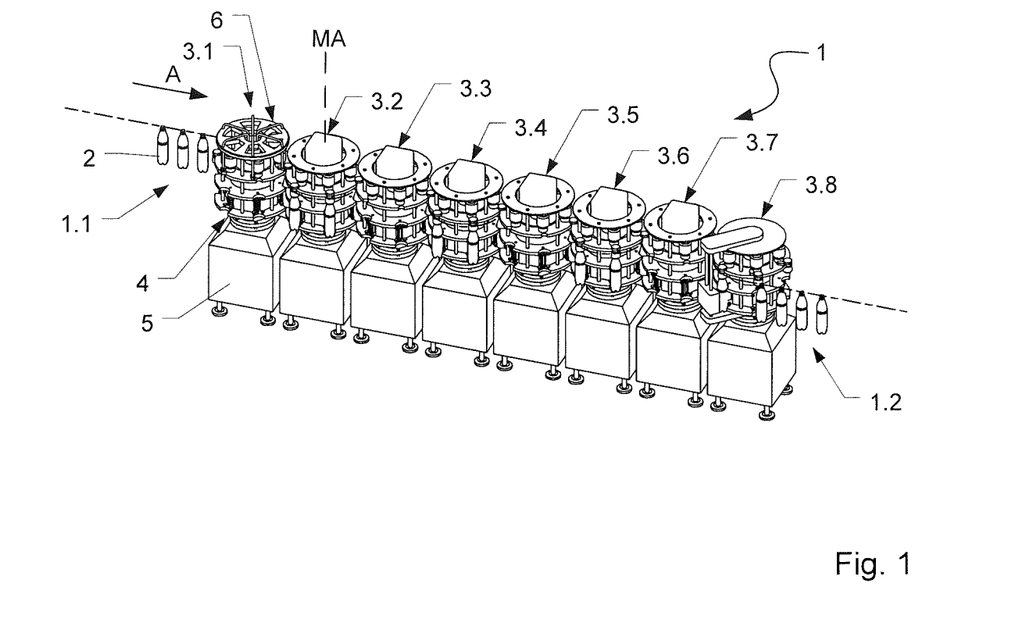
FIG. 1 is a perspective view of a container-handling machine including a plurality of machine modules.

FIG. 1 shows a container-handling machine 1 that applies furnishings to containers 2. An example of a container 2 is a bottle. An example of a furnishing is printed matter.

The container-handling machine 1 applies a furnishing by either printing directly on the container's surface or by applying a label. In the former case, the container-handling machine 1 includes inkjet print heads.

Figure 2A:
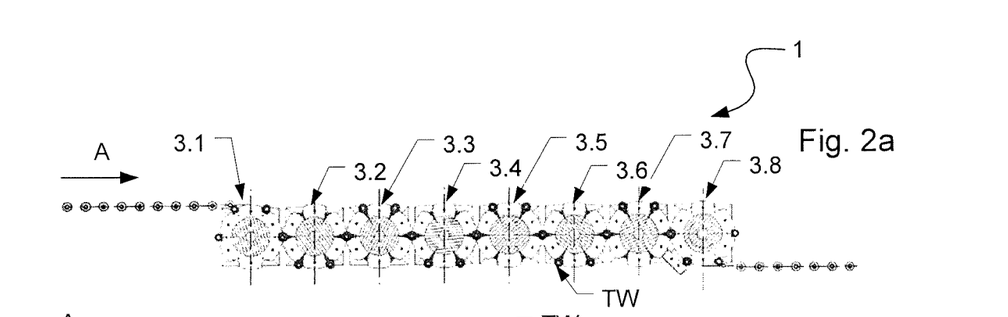
FIG. 2a shows a view from above the container-handling machine of FIG. 1.
Figure 2B:
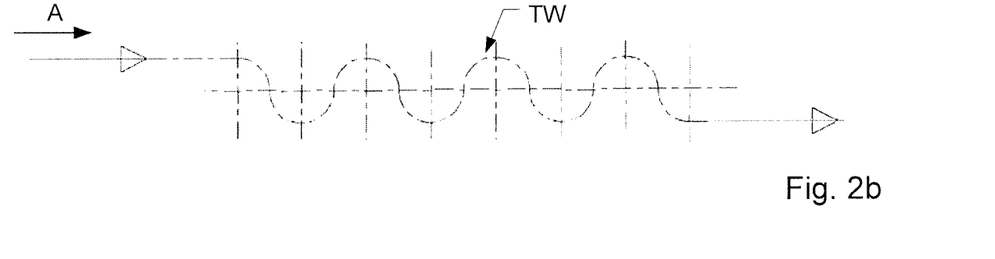
FIG. 2b shows a transport path through the container-handling machine of FIG. 1.

An external transporter transports upright containers 2 in a transport direction A for feeding into a container inlet of the container-handling machine 1. The containers 2 then move along a serpentine transport path TW, as shown in FIGS. 2a and 2b. After having been printed upon, the upright containers 2 pass through a container outlet 1.2. An external transporter receives the upright containers 2 and conveys them away.

The container-handling machine 1 includes machine modules 3.1-3.n that succeed one another in the transport direction A. In the illustrated embodiment, there are eight machine modules 3.1-3.8. However, other implementations have different numbers of machine modules 3.1-3.8. Each machine module 3.1-38 has a base 4 that supports whatever functional elements are appropriate to the particular machine 3.1-3.8. The bases 4 of the machine modules 3.1-3.8 are identical.

Each base 4 includes a housing 5 and a transport element 6 that is arranged on top of the module housing 5. A drive-and-control unit disposed in the housing 5 drives the transport element 6 about a vertical machine axis MA. Each transport element 6 has identical handling stations 8 attached to its periphery. The handling stations 8 differ from one machine module to the next depending on the function of the particular machine module 3.n.

Each handling station 8 performs a part of the entire container-handling operation. Examples of handling stations 8 include pre-treatment units, for example for sterilizing containers, detecting units for detecting certain container features, printing units that print on containers using one or more inkjet print heads, post-treatment units, for example curing units for drying the printed image, and inspection units.

The container-handling machine 1 includes retaining-and-centering units 10. Each retaining-and-centering unit 10 receives a container 2 at the container inlet 1.1 and shepherds that container 2 all the way through the container-handling machine 1 until it finally releases the container 2 at the container outlet 1.2. Each retaining-and-centering unit 10 thus retains its associated container 2 at each of the holding stations 8

Each handling station 8 has a mechanism for holding a retaining-and-centering unit 10 during its residency at the handling station 8 and releasing it when done. The retaining-and-centering unit 10 is attaches to and detaches from each of a succession of handling stations 8. As the transport element 6 rotates, the container 2 that is to be handled is held against a handling unit and conveyed onward in the transport direction A at the same time.

The transport elements 6 of adjacent machine modules 3.n, 3.(n+1) rotate in opposite directions. For each machine module 3.n, except the last one, the transport element 6 of that machine module 3.n transfers a retaining-and-centering unit 10 to the transport element 6 of the immediately downstream machine module 3.(n+1). This occurs when handling stations 8 of transport elements 6 of successive machine modules stand opposite each other. As a result, the machine modules 3.1-3.8 cooperate to form a transport device that transports containers 2 from the container inlet 1.1 to the container outlet 1.2 along a serpentine path TW, with each container 2 being held by the same retaining-and-centering unit 10 for its entire journey.

Figure 3:
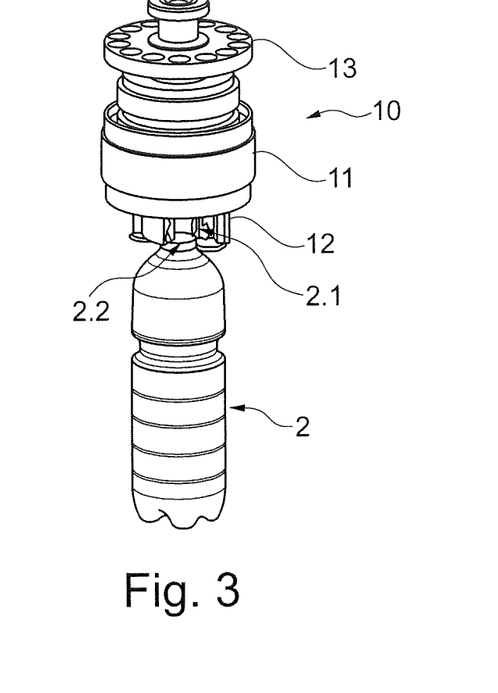
FIG. 3 is a perspective view of a container held on a retaining-and-centering unit as it traverses the container-handling machine of FIG. 1.

FIG. 3 shows an embodiment of a retaining-and-centering unit 10 with a container 2 provided thereon. The retaining-and-centering unit 10 has a securing section 11, a retaining section 12, and a rotor section 13.

The securing section 11 secures the retaining-and-centering unit 10 relative to either a transport element 6 or to a handling station 8.

Figure 4:
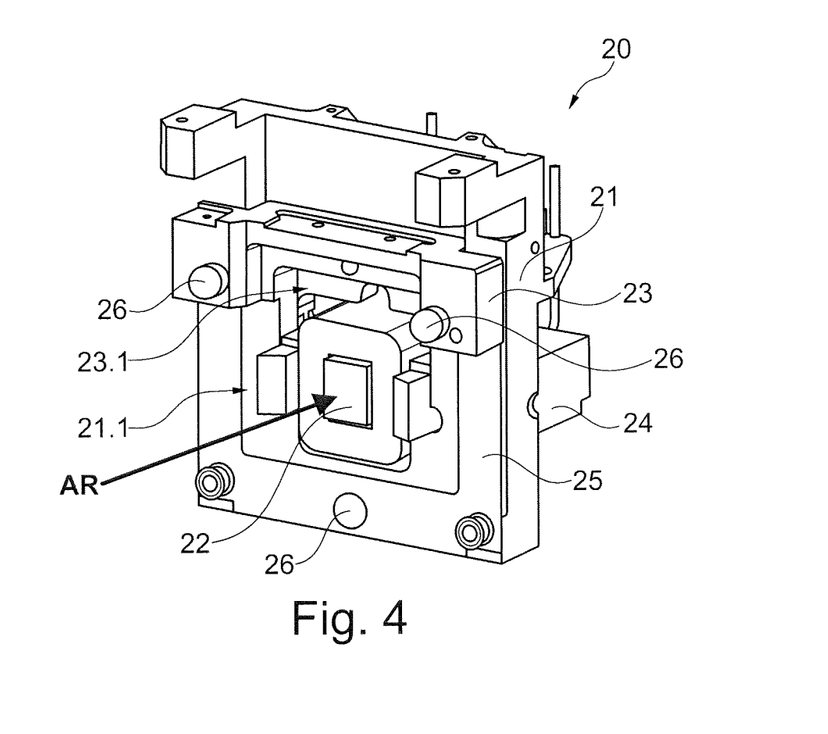
FIG. 4 shows a securing device for securing a retaining-and-centering unit at a handling station of the container-handling machine of FIG. 1.

In the illustrated embodiment, the securing section 11 has a circular cross-section that projects radially relative to those sections of the retaining-and-centering device 10 that are above and below the securing section 11. The securing section 11 electromagnetically or mechanically engages a securing device 20 at the handling station 8, an example of which is shown in FIG. 4. The securing device's shape complements that of the securing section 11. This engagement can occur, for example, as a result of the securing section's radial projection.

Referring back to FIG. 3, the retaining section 12, which is at the lower free end of the retaining-and-centering unit 10, holds a container 2 near its mouth 2.1. In the illustrated embodiment, the retaining section 12 suspends the container 2.

The rotor section 13 interconnects with the retaining section 12 such that when the rotor section 13 rotates, so does the container. The rotor section 13 thus rotates the container 2 relative to the securing section 3. This rotation allows the container's outer surface to be printed upon.

Preferably, the rotor section 13 has peripherally-arranged permanent magnets that interact with a stator coil on the transport element 6. As such, it forms the rotor of an electromagnetic direct-drive.

When the retaining-and-centering unit 10 is engaged in a container-handling machine 1, the securing section 11 forms a fixed primary part. The retaining section 12 and the rotor section 13 form a secondary part that rotates relative to the primary part.

A variety of ways can be used to hold the container 2 at the retaining-and-centering unit 10. In the illustrated embodiment, a clamp applies a clamping force between the container's mouth 2.1 and a neck ring 2.2 that protrudes radially outward near the mouth 2.1. The clamp tightens a gripping section that engages behind the neck ring 2.2. The clamping holds the container 2 at the center of the retaining-and-centering unit 10 in such a way that the retaining section's axis-of-rotation, or that of the rotor section 13, coincides with the container's vertical axis.

FIG. 4 shows a securing device 20 that secures a retaining-and-centering unit 10 at a handling station 8 of a container-handling machine 1. The securing device 20 includes a carrier 21, a securing apparatus 22, and a receiving unit 23

The carrier 21 connects the securing device 20 to the handling station 8. The securing apparatus 22 detachably secures a retaining-and-centering unit 10 to the handling station 8.

As used herein, to "detachably secure" an article means to secure the article in such a way that the article can easily be detached when desired. It is understood that although all joined articles are to some extent detachable, it is understood that detachable securing means that the article can be repeatedly detached and secured with no perceptible damage to either article.

The securing apparatus 22 includes an electromagnet that interacts with the retaining-and-centering unit's retaining section 12. The electromagnet detachably secures the retaining-and-centering unit 10 relative to the handling station 8 by magnetically attracting the retaining section 12. Detachment easily occurs by cutting off the current that supplies the electromagnet.

The receiving unit 23 couples the carrier 21 to the securing apparatus 22. It does so in such a way that the receiving unit 23 can be displaced in a receiving direction AR. This receiving direction AR is the same as the direction in which the retaining-and-centering unit 10 advances and retracts. As shown in the figure, the receiving direction AR is radial to the machine axis MA This means that when a retaining-and-centering unit 10 interacts with a handling station 8, it is positioned in front of the handling station 8 and advances and retracts along the radial direction, as shown in FIG. 4.

The carrier 21 and the receiving unit 23 both have frame-like structures that have openings. The carrier's frame has an inner opening 21.1 that holds the receiving unit 23 in such a way that the receiving unit 23 can still move. The receiving unit's frame has an opening 23.1 that holds the securing apparatus 22. Sliding guides on the receiving unit 23 or on the carrier 21 permit the receiving unit 23 to be displaced with precision on the carrier 21.

A drive 24 promotes improved transfer of a retaining-and-centering unit 10 between two handling stations 8, one of which receives the retaining-and-centering unit 10 and the other of which releases it. The receiving unit 23 is on the carrier 21 so that the drive 24 moves it parallel to the receiving direction AR.

Examples of a suitable drive 24 include an electrical drive, a linear drive, a hydraulic drive, and a pneumatic drive. In some embodiments, the drive 24 includes one or more magnets, such as electromagnets, that can be operated to cause relative motion between the receiving unit 23 and the carrier 21 in a direction radial to the machine axis MA of the transport element 6.

The drive 24 moves the receiving unit 23 in such a way that the receiving unit 23 moves to an advanced position at a time when the advancing of the retaining-and-centering unit 10 to the securing device 20 for the purpose of securing the latter also takes place. In other words, the drive 24 drives the receiving unit 23 toward the advanced retaining-and-centering unit 10. After the securing apparatus 22 accepts the receiving unit 23 and secures the retaining-and-centering unit 10, the receiving unit 23 moves to a retracted position. It is at this position, at the handling station 8 that includes the securing device 20, that container handling takes place.

Alternatively it is possible to control the drive 24 to move the receiving unit 23 to a retracted position at the same time that the retaining-and-centering unit 10 advances to the securing apparatus 20 to secure it. In other words, the drive 24 moves the receiving unit 23 away from the advanced retaining-and-centering unit 10.

After the securing apparatus 22 accepts the receiving unit 23 and secures the retaining-and-centering unit 10, the receiving unit 23 moves to a second advanced position. This is where the container handling is subsequently performed at the handling station 8, which includes the securing device 20.

The movement stroke ensures that the receiving unit 23 moves toward and/or away from the retaining-and-centering unit 10 that is to be transferred. Such movement promotes a soft transfer of the retaining-and-centering unit 10 from one handling station 8 to another. This soft transfer, in turn, causes the container-handling machine 1 to run smoothly with minimal vibrations.

The securing device 20 includes an actuator 25 that acts between the carrier 21 and the receiving unit 23. In the embodiment shown in FIGS. 4-6, a U-shaped leaf spring running about the inner opening 21 forms the actuator 25. The actuator 25 is tensioned when the receiving unit 23 moves into the advanced position.

Figure 5:
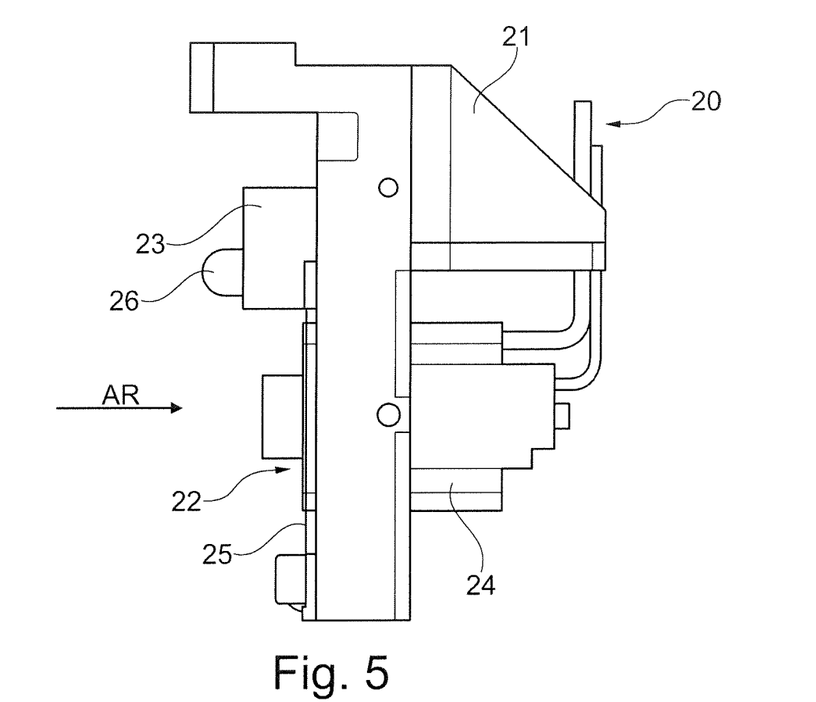
FIG. 5 is a side view of the securing device of FIG. 4.
Figure 6:
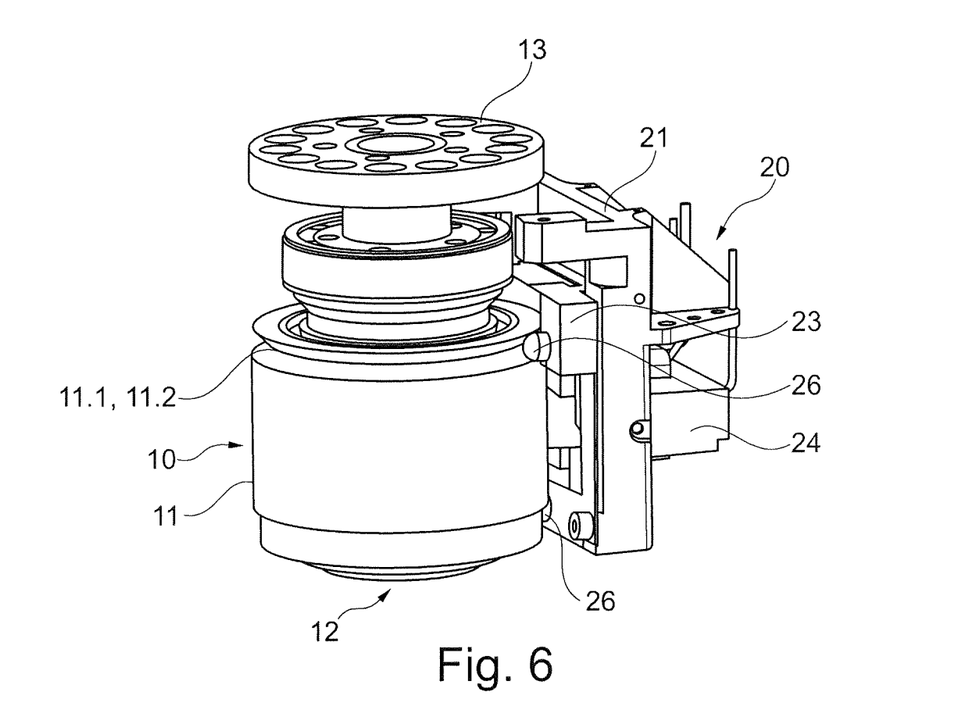
FIG. 6 is a perspective view of the securing device of FIG. 4 with a retaining-and-centering element attached.

Alternatively, the actuator 25 is tensioned when the receiving unit 23 moves into the retracted position. This spring pre-tensioning can subsequently be used to return the receiving unit 23 to its initial position.

If advancing the receiving unit 23 transfers the retaining-and-centering unit 10, the actuator 25 moves the receiving unit 23 into the retracted position. On the other hand, if retracting the receiving unit 23 transfers the retaining-and-centering unit 10, the actuator 25 moves the receiving unit 23 into the advance position. In either case, the actuator 25 assists the driver 24 at least partially in causing return movement of the receiving unit 23.

Preferably, there exists at least one stop on the carrier 21 against which the receiving unit 23 comes into contact in either the retracted or advanced position after the transfer of the retaining-and-centering unit 10. The drive 24 either pulls the receiving unit 23 against the stop or pushes it against the stop. This ensures that, during the container handling process, the receiving unit 23 adopts a defined position relative to the carrier 21 and hence a defined position at the handling station 8. Having done so, it becomes possible to maintain a defined distance between the container's wall and a printing head that is printing on it. This promotes more precise printing.

FIGS. 4 and 6 show protrusions 26 on the movable receiving unit 26 of the securing device 20. Typically, a hemispherical contact point forms the protrusions 26. The figures also show a recess 11.1 or depression formed by a groove 11.2 that runs around the periphery of the securing section 11.

The protrusions 26 ensure that the securing device 20 receives the retaining-and-centering unit 10 in the correct position. In doing so, the protrusions 26 interact with corresponding recesses or depressions in the securing section on the retaining-and-centering unit 10.

In the illustrated embodiment, the receiving unit 23 has first, second, and third protrusions 26. The first and second protrusions 26 lie spaced apart from one another in an upper region of the receiving unit 23. These engage a V-shaped groove 11.2 in the securing section 11 of the retaining-and-centering unit 10. The third protrusion 26 is at a lower region of the receiving unit 23. This third protrusion 26 bears against the lower region of the securing section 11.

As can be seen in FIG. 6, the securing section 11 contacts the receiving unit 23 at three hemispherical protrusions 26 and attaches to the handling station 8 via the securing apparatus 22. This ensures that the retaining-and-centering unit 10 is held at a defined height at the handling station 8. A well-defined height is particularly advantageous for printing on containers 2 when different machine modules 3.1-3.$n$ print different colors because accurate positioning of the retaining-and-centering unit 10 ensures the differently colored images come to be superimposed accurately positioned over one another.

The protrusions 26 need not be hemispherical. For example, it is possible for protrusions 26 to instead be shaped like segments of a circle. It is also possible to have web-like protrusions 26. All of these shapes can be made to interact with corresponding recesses 11.1 on the retaining-and-centering unit 10. It is also possible for the protrusions 26 and the recesses 11.1 to trade places, so that the protrusions are instead on the retaining-and-centering unit 10 and the corresponding recesses are on the receiving unit 23.

Some embodiments have dampers. These dampers are either on the receiving unit 23 or between the carrier 21 and the receiving unit 23. These dampers suppress vibrations caused by the transfer of the retaining-and-centering units 10. Such dampers can be implemented by making the protrusions 26 from an elastic material or by incorporating suitable shock absorbers.

In the embodiments described thus far, transferring a retaining-and-centering unit 10 from one handling station 8 to the next is carried out by having the receiving unit 23 of the receiving handling-station 8 be moved relative to the releasing handling-station 8, either by moving towards or away from it.

However, there are many alternatives to this method. For example, it is also possible for the receiving unit 23 of the releasing handling-station 8 to be moved toward the receiving handling-station 8 by a displacing motion of the receiving unit 23 relative to the carrier 21. Another alternative is for the receiving unit 23 of the releasing handling-station 8 to be moved away from the receiving handling-station 8 by a displacing motion of the receiving unit 23 relative to the carrier 21. As yet another alternative, both the receiving unit 23 of the releasing handling-station 8 and the receiving unit 23 of the receiving handling-station 8 are moved relative to one another so that a transfer of the retaining-and-centering unit 10 between the handling stations 8 can take place with as little impact and vibration as possible.

It is particularly preferable that the transfer of the retaining-and-centering unit 10 from the releasing securing device 20 to the receiving securing device 20 be carried out without any play. To do this, the receiving unit 23 of the receiving securing-device 20 is far enough toward the releasing securing-device 20 that, as the handling stations 8 move toward one another, the transport elements 6 that rotate in the opposite direction of rotation will press the retaining-and-centering unit 10 against the receiving receiving-unit 23. This pushes the latter at least partially back in the radial direction. The same applies when the releasing receiving-unit 23 is either advanced or retracted relative to the receiving receiving-unit 23. In this case the releasing receiving-unit 23 is displaced far enough to at least partially push back the releasing receiving unit 23 as the handling stations 8 move toward one another. Lastly, in the case of the embodiment in which the releasing and the receiving receiving-units 23 are simultaneously moved by a radial displacing motion, it is possible to push back both the releasing and the receiving receiving-units 23.

Figure 7:
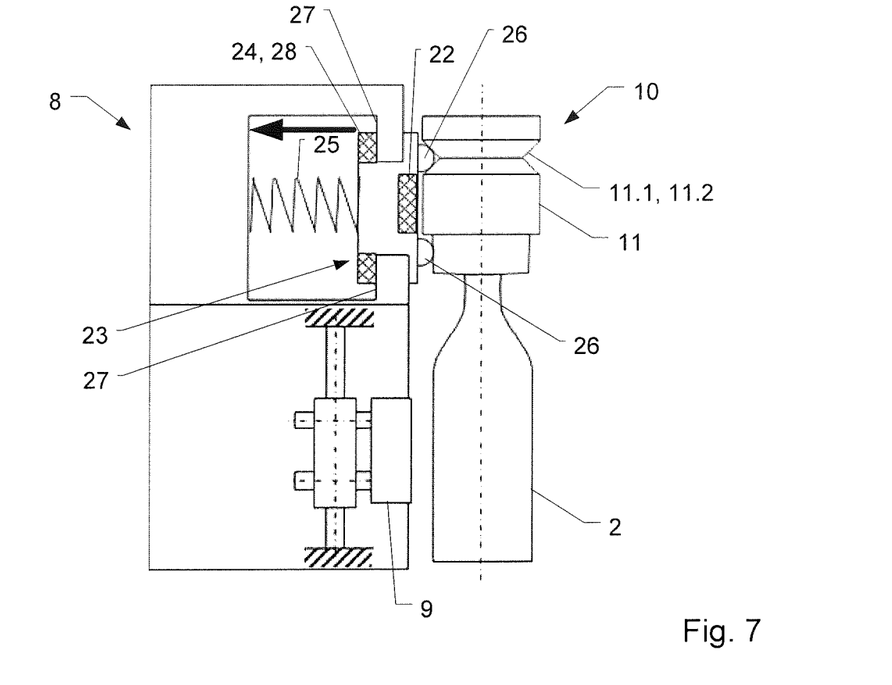
FIG. 7 is a side view of a handling station with a retaining-and-centering unit arranged thereon and holding a container.

FIG. 7 shows a cross-sectional side view of a handling station 8 configured as a printing station. The handling station 8 includes a vertically adjustable print-head 9 for printing directly on a container 2. The handling station 8 also has a securing device 20 for securing a retaining-and-centering unit 10.

An axially-displaceable receiving unit 23 at the handling station 8 promotes essentially vibration-free transfer of the retaining-and-centering unit 10 between the handling station 8 and adjacent machine modules. In the illustrated embodiment, the receiving unit 23 is configured so that, to print on the container 2, the retaining-and-centering unit 10 is positioned in an advanced position and brought into a retracted position to receive or release the retaining-and-centering unit 10 from a machine module preceding in transport direction A or to a machine module following in transport direction A.

FIG. 7 shows the advanced position, in which the displaceable receiving unit 23 lies against the stop 27. A magnet 28 secures the receiving unit 23 against the stop 27 such that the retaining-and-centering unit 10, and hence the container 2, always adopts a fixed position at the handling station 8 during printing. Reducing the magnet's force, or simply turning it off, allows an actuator 25 to propel the receiving unit 23 backward toward the handling station 8, as indicated by the arrow.

After the transfer of the retaining-and-centering unit 10, reactivating the magnet 28 urges the receiving unit 23 against the force of the actuator 25 thus moving it into an advanced position and into contact with the stop 27. The container handling, and in particular, printing on the container 2, is then carried out with the container in this position.

Figure 8:
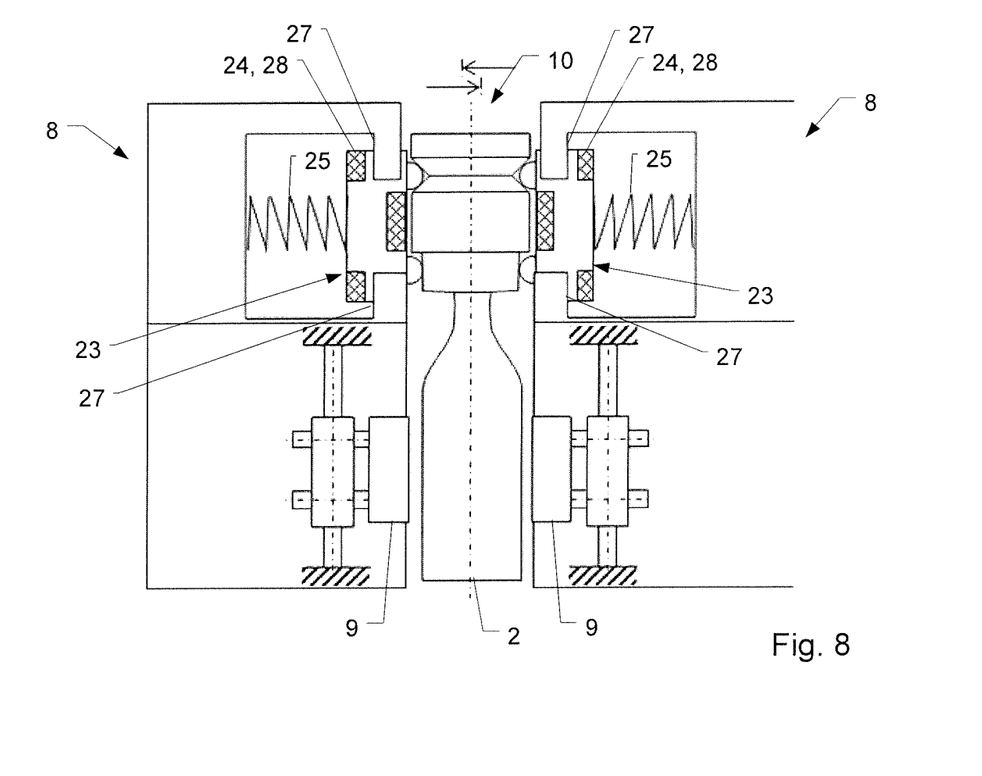
FIG. 8 shows a retaining-and-centering unit, with its associated container, being transferred from a first handling station to a second handling station.

FIG. 8 shows the transfer of a retaining-and-centering unit 10 from a first handling station 8 retained at a first machine module to a second handling station 8 retained at a second machine module. The sequential machine modules 3.1-3.$n$ are arranged relative to one another in such a way that they have negative play relative to each other. This means that, during the handling of the containers 2 at the machine modules 3.1-3.$n$, the retaining-and-centering units 10 are arranged such that, without any initial pulling back or moving back of at least one receiving unit 23 performing the transfer, the retaining-and-centering unit 10 would collide with the receiving securing-device 20 as the rotors of the two machine modules rotate contrary to one another. To avoid such a collision, both the receiving units 23 of the handling stations 8 between which the transfer of the retaining-and-centering unit 10 takes place move radially inward synchronously with the rotor's rotary motion. Once the handling stations 8 are directly opposite one another, the receiving units 23 are pushed back at least slightly. thus causing a play-free transfer of the retaining-and-centering unit 10 from the releasing handling-station to the receiving handling-station. This procedure reduces the vibrations that would otherwise arise as a result of the transfer of the retaining-and-centering units 10.

In the foregoing embodiments, an electromagnet forms the securing apparatus 22. However, alternative embodiments use a combination of an electromagnet and a permanent magnet to form the securing apparatus 22. This ensures that the retaining-and-centering units 10 remain secured at the respective securing devices 20 at their respective handling stations 8 upon a loss of power.

In such embodiments, where an electromagnet and permanent magnet cooperate, it is useful to manipulate the electromagnet's field to achieve the desired effect. For instance, for receiving a retaining-and-centering unit 10 at a receiving securing-device 20, the electromagnet's field constructively adds to that of the permanent magnet to increase the force of attraction. Conversely, for releasing the retaining-and-centering unit 10, the electromagnet's field is made to destructively adds to the permanent magnet's field to thereby reduce the total magnetic field. This reduces the magnetic attraction and thus permits easy removal of the retaining-and-centering unit 10 from the releasing securing-device 20.

The invention has been described hereinbefore by reference to embodiments. It goes without saying that many variations or modifications are possible without departing from the inventive concept underlying the invention.

The invention claimed is:

1. An apparatus comprising a carrier, a receiving unit, a drive, and a securing apparatus that cooperate to detachably secure a retaining-and-centering unit to a first-handling station and to permit transferring said retaining-and-centering unit to a second handling-station, wherein said retaining-and-centering unit is supplied to said first handling-station in a receiving direction of said first handling-station, wherein said carrier secures a securing device to said first handling-station, wherein said securing apparatus detachably secures said retaining-and-centering unit to said first handling-station, wherein said receiving unit connects said securing apparatus to said carrier, wherein said receiving unit is on said carrier, and wherein said drive moves said receiving unit parallel to said receiving direction.

2. The apparatus of claim 1, wherein said drive is configured to cause said receiving unit to transition between an advanced position and a retracted position, wherein transfer of said retaining-and-centering unit from said first handling-station to said second handling-station occurs when said receiving unit is in said advanced position, wherein container processing occurs when said receiving unit is in said retracted position, and wherein transfer of said retaining-and-centering unit comprises an action selected from the group consisting of receiving said retaining-and-centering unit at said second handling-station and releasing said retaining-and-centering unit from said first handling-station.

3. The apparatus of claim 1, wherein said drive is configured to cause said receiving unit to transition between an advanced position and a retracted position, wherein transfer of said retaining-and-centering unit to said second handling-station occurs when said receiving unit is in said retracted position, wherein container processing occurs when said receiving unit is in said advanced position, and wherein transfer of said retaining-and-centering unit comprises an action selected from the group consisting of receiving said retaining-and-centering unit at said second handling position and releasing said retaining-and-centering unit from said first handling position.

4. The apparatus of claim 1, wherein said carrier comprises a guide that guides movement of said receiving unit in a direction parallel to said receiving direction.

5. The apparatus of claim 1, further comprising a spring, wherein said spring couples said receiving unit to said carrier.

6. The apparatus of claim 1, wherein a spring that is tensioned during movement into an advanced position of said receiving unit couples said receiving unit to said carrier.

7. The apparatus of claim 1, further comprising a spring that is configured to apply a force that urges movement of said receiving unit to said retracted position.

8. The apparatus of claim 1, wherein said drive comprises an electromagnet.

9. The apparatus of claim 1, further comprising a fixed stop, wherein said drive is configured to move said receiving unit to said fixed stop and for securing said receiving unit to said fixed stop.

10. The apparatus of claim 1, further comprising a protrusion and a recess that engages said protrusion, wherein said recess is on a first element and said protrusion is on a second element, wherein when said first element receives said retaining-and-centering unit, said second element is said retaining-and-centering unit, and wherein, when said first element is said retaining-and-centering unit, said second element receives said retaining-and-centering unit.

11. The apparatus of claim 1, wherein said receiving unit comprises hemispherical protrusions that engage a groove around a periphery of said retaining-and-centering unit.

12. The apparatus of claim 1, further comprising a damper, wherein said damper dampens impacts that occur upon transfer of said retaining-and-centering unit, wherein said damper is disposed at a location selected from the group consisting of said receiving unit and between said receiving unit and said carrier.

13. The apparatus of claim 1, further comprising a container-transport section on which containers are moved in a transport direction from a container inlet to a container outlet, said container-transport section comprising plural transport elements, each of which rotates about a vertical machine-axis thereof and each of which comprises plural handling-stations at which containers are held, among which are said first and second handling-stations, wherein said plural transport elements comprise a first transport-element and a second transport-element that is adjacent to said first transport-element, wherein said plural handling stations comprise said first handling-station, which is at said first transport-element and said second handling-station, which is at said second transport-element, wherein said retaining-and-centering unit is passed from said first handling-station to said second handling-station by detaching said retaining-and-centering unit from said first handling-station and attaching said retaining-and-centering unit to said second handling-station, wherein, when passing said retaining-and-centering unit, said drive moves said receiving unit parallel to said receiving direction and wherein said securing apparatus, by means of which said retaining-and-centering unit is detachably secured to said first handling-station, is arranged on said receiving-unit, said receiving unit being movable.

14. The apparatus of claim 13, wherein, when passing said retaining-and-centering unit, a drive of a receiving device at one of said handling stations is actuated such that relative movement occurs between receiving units of securing devices of both handling stations.

15. The apparatus of claim 13, wherein said securing device secured to said first handling-station is a releasing securing-device, wherein a securing device secured to said second handling-station is a receiving securing-device, wherein transferring said retaining-and-centering unit to a second handling-station comprises causing a drive to move a releasing unit to a radially retracted position, and wherein said releasing unit is selected from the group consisting of a releasing unit of said releasing securing-device and a releasing unit of said receiving securing-device.

16. The apparatus of claim 13, wherein said securing device secured to said first handling-station is a releasing securing-device, wherein a securing device secured to said second handling-station is a receiving securing-device, wherein transferring said retaining-and-centering unit to a second handling-station comprises moving a receiving unit of said receiving securing-device such that as said first and second handling stations move towards each other, contrary motion of said first and second transport elements causes said retaining-and-centering unit to be pressed against said receiving unit of said receiving securing-device, thereby causing said receiving unit of said receiving securing-device to be partially pushed back.

17. The apparatus of claim 13, wherein said receiving unit moves synchronously with rotation of said first and second transport-elements.

18. The apparatus of claim 1, further comprising an actuator, wherein said actuator couples said receiving unit to said carrier.

19. The apparatus of claim 1, wherein said drive is selected from the group consisting of a motorized drive, a pneumatic drive, and a hydraulic drive.

20. A method comprising moving a retaining-and-centering unit along a transport section of a container-handling machine, said transport section comprising a plurality of transport elements, each of which rotates about a vertical machine-axis thereof, each of said transport elements being configured to hold containers at handling stations thereof, wherein said retaining-and-centering unit holds a container that is to be treated, wherein said plurality of transport elements comprises a first transport element and a second transport element adjacent to said first transport element, wherein said first transport element comprises a first handling station and said second transport element comprises a second handling station, wherein each of said first and second handling stations comprises a receiving unit and a carrier, wherein moving said retaining-and-centering unit comprises transferring said retaining-and-centering unit from said first handling station to said second handling station, wherein transferring a container comprises releasing said retaining-and-centering unit from a releasing securing-device of said first handling station and passing said retaining-and-centering unit to said second handling station, wherein, during said transfer, a selected receiving unit moves radially relative to a selected axis, wherein said selected receiving unit is selected from the group consisting of said receiving unit of said first handling station and said receiving unit of said second handling station, wherein, when said selected receiving unit is said receiving unit of said first handling station said selected axis is the vertical machine-axis of said first transport element, and wherein, when said selected receiving unit is said receiving unit of said second handling station said selected axis is the vertical machine-axis of said second transport element.

\* \* \* \* \*